INVENTOR
HOWARD C. BLAKE
JAMES F. McCLELLAND JR.
BY
Farley, Forster & Farley
ATTORNEYS

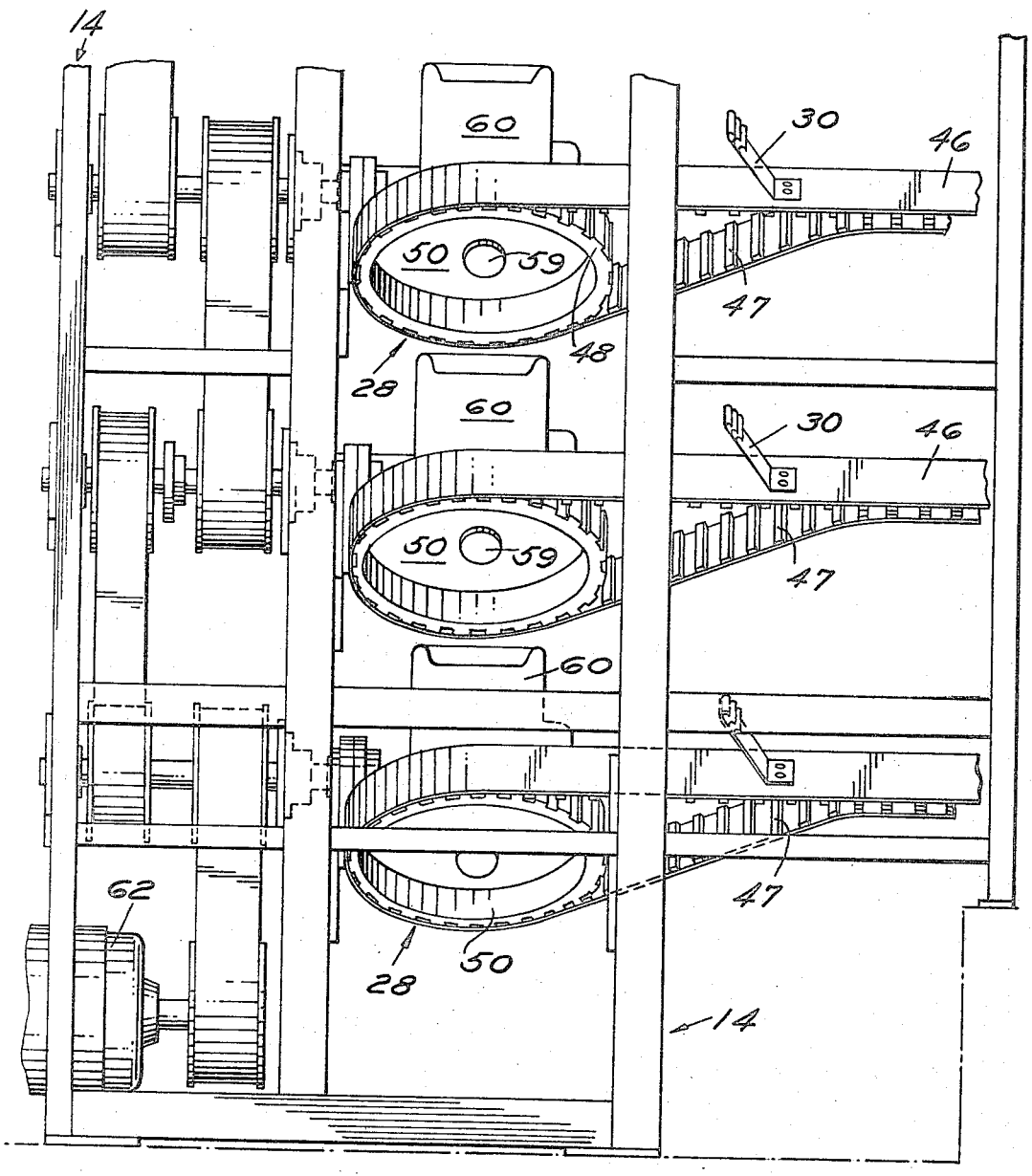

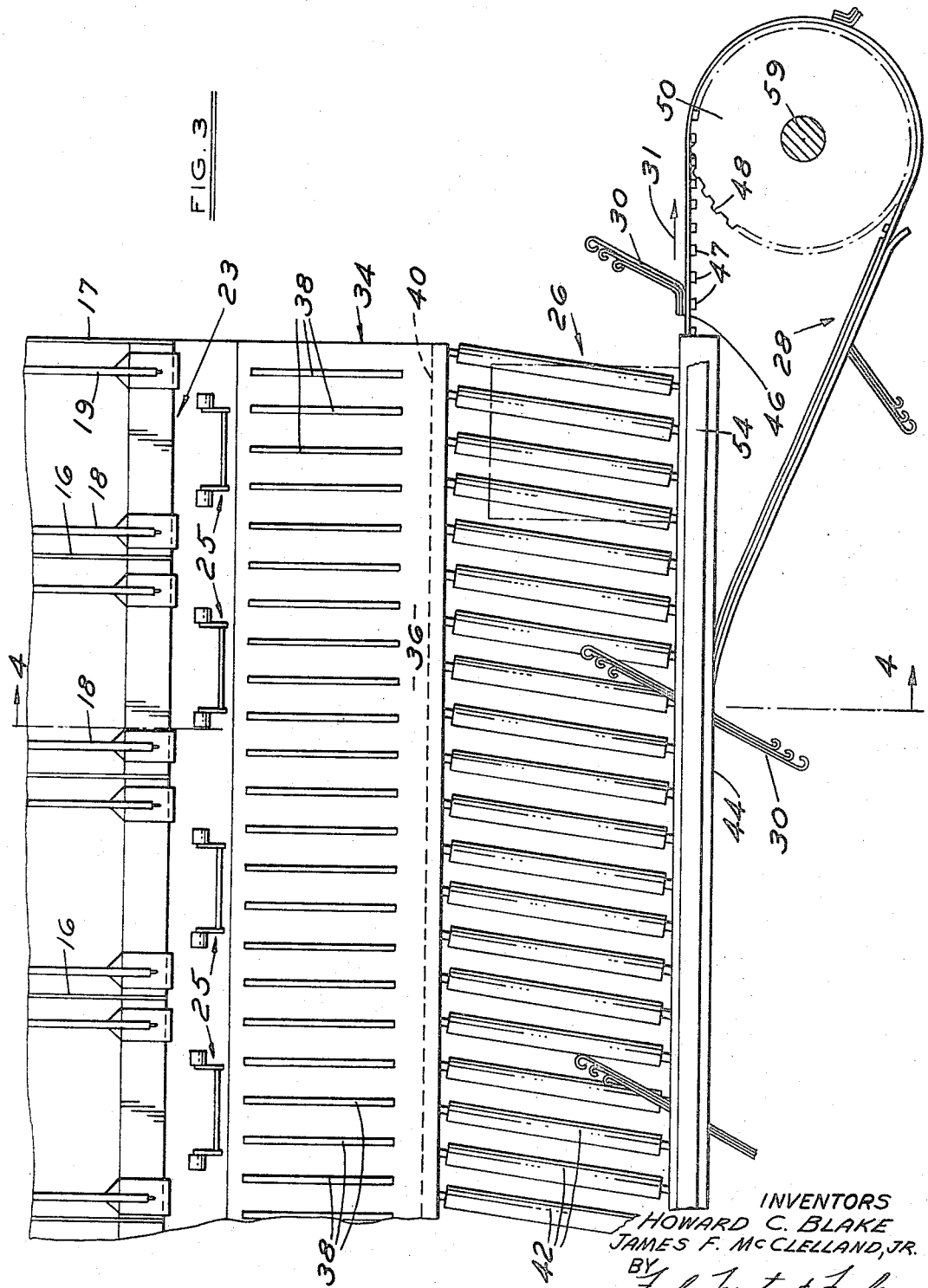

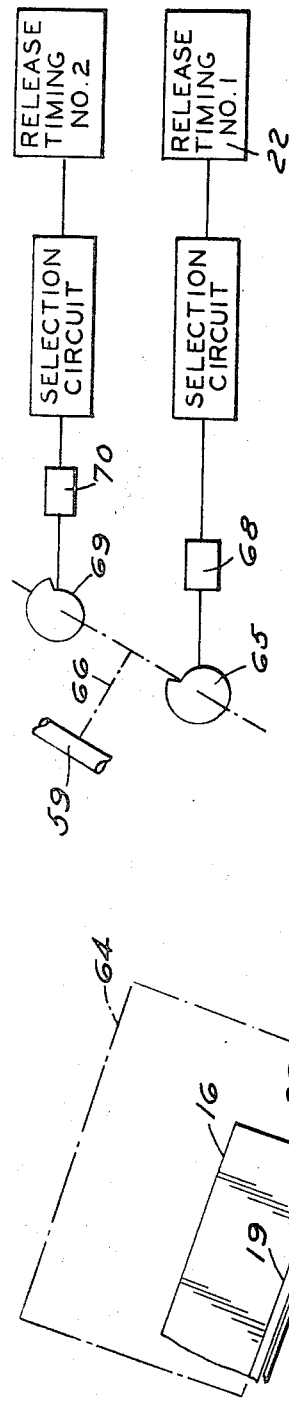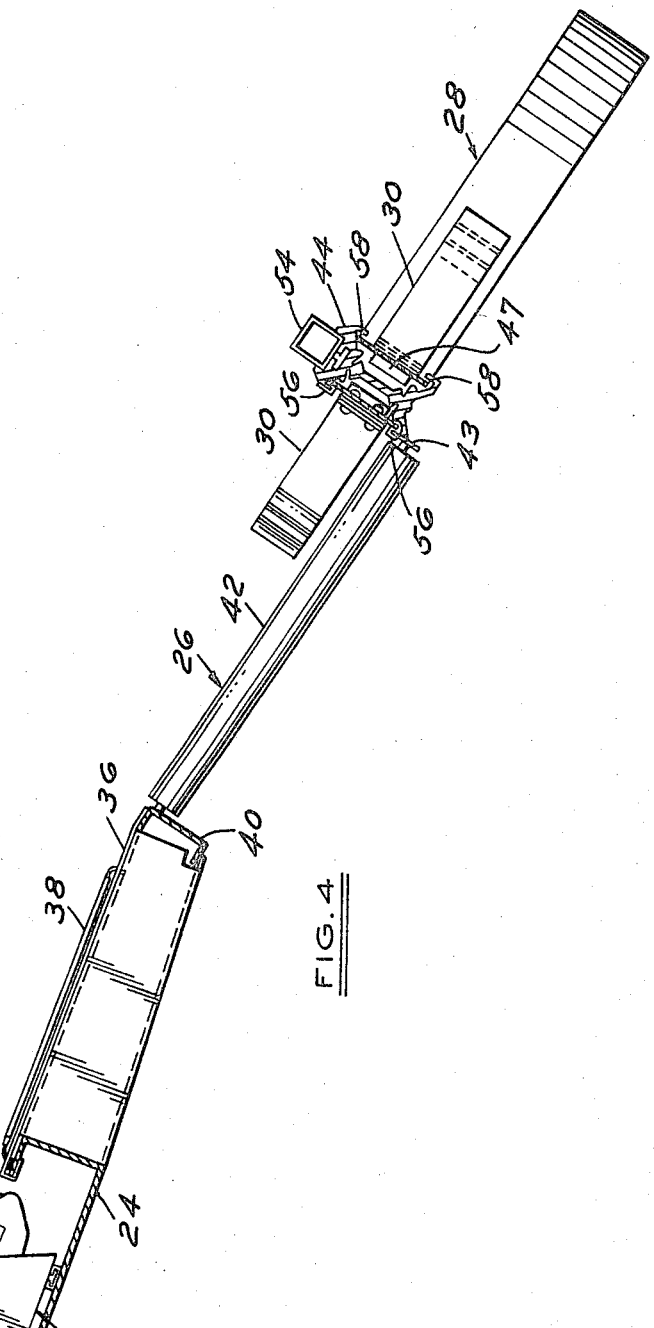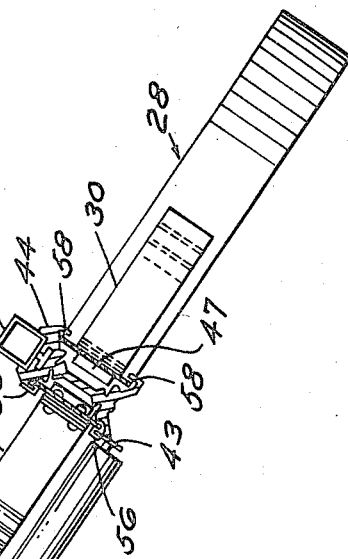

United States Patent Office 3,416,644
Patented Dec. 17, 1968

3,416,644
ARTICLE CONVEYING APPARATUS FOR
AUTOMATIC WAREHOUSING
Howard C. Blake, 23580 Norwood, Oak Park, Mich.
48237, and James F. McClelland, Jr., 40 Beacon Hill,
Grosse Pointe Farms, Mich. 48236
Filed Oct. 3, 1966, Ser. No. 583,684
21 Claims. (Cl. 198—43)

ABSTRACT OF THE DISCLOSURE

Apparatus for receiving and conveying articles stored on inclined chutes in which the articles released from the chutes are discharged onto an inclined roller conveyor and moved along the roller conveyor by pushers of an endless belt conveyor travelling along the lower side of the roller conveyor. Preferably the axes of the rollers are skewed to urge the articles against the belt conveyor and are inclined at an angle greater than the inclinations of the chutes and greater than the inclination of an apron mounted between the discharge end of the chutes and upper side of the roller conveyor. The belt conveyor pushers are of resilient construction and are operated in timed relation with the release of articles from the chutes.

---

This invention is directed to improved apparatus for receiving and conveying articles, particularly articles stored on supporting structure such as inclined chutes of automatic warehousing equipment.

Warehousing equipment of this type conventionally includes at least one chute for each type of article stocked, with the normal gravity-urged movement of articles on each chute being controlled by a release device at the lower discharge end of the chute. Such a warehousing arrangement is shown in U.S. Patent 3,064,783, and details of the construction of one form of release device may be found in U.S. Patent 3,088,569. When a release device is actuated it permits one article on that particular chute to move off the discharge end thereof; and by connecting all the release devices of an installation in one master control it becomes possible to mechanize the process of filling orders for articles in storage in the warehouse.

The conveying of articles discharged from the chutes by operation of the release devices has been one factor limiting the rate at which orders can be processed. This conveying operation becomes more complex as differences in article size and weight increase. For example, with the usual arrangement employing a moving belt for conveying released articles, the relative position between the belt and the end of a chute required to permit an article of one size to move by gravity from the chute onto the belt may be improper for an article of a different size or a different weight. Even within a relatively narrow range of satisfactory operation for various sizes and weights of articles, a random spacing of articles along the belt results from differences in frictional engagement between articles and the belt.

The improved article receiving and conveying apparatus of the invention provides controlled article movement from the discharge end of chutes to a moving conveyor element, and accommodates a wide range of articles both in size and weight, with these articles preferably being placed at evenly spaced increments along the conveyor element.

A preferred form of the improved apparatus comprises the combination of a roller conveyor mounted with one side thereof extending along the discharge end of a row of inclined chutes, an endless conveyor, and means mounting the endless conveyor for travel on forwarding and return reaches with the forwarding reach adjacent and parallel to the other side of the roller conveyor and adapted to be contacted by an article supported thereon, the rollers of the roller conveyor being placed with their axes extending at an acute angle to the forwarding reach of the endless conveyor with reference to the forwarding direction of travel thereof whereby an article supported on the roller conveyor will be urged into engagement with the endless conveyor in response to forwarding article movement.

Other preferred features include mounting of the roller conveyor with the axes of its rollers in an inclined plane extending in the general direction of inclination of the chutes and at a slightly greater angle of inclination; equipping the endless conveyor with a series of equally spaced pusher members projecting outwardly so as to engage and propel an article along the roller conveyor; and installing a slide or apron between the discharge end of the inclined chutes and the side of the roller conveyor adjacent thereto, the apron extending at an angle of inclination slightly greater than that of the chutes but less than that of the plane of the axes of the conveyor rollers. The article release devices are mounted between the discharge end of the chutes and the apron.

These and other features and advantages of the invention will become more apparent from the following description of the representative embodiment thereof disclosed in the accompanying drawings in which:

FIGURE 2 is a sectional elevation taken as indicated by the line 2—2 of FIG. 1 showing drive units for each endless conveyor of the apparatus;

FIGURE 3 is a sectional plan view taken as indicated by the line 3—3 of FIG. 1;

FIGURE 4 is an enlarged sectional elevation taken as indicated by the line 4—4 of FIG. 3; and FIGURE 5 is a schematic view illustrating the mechanical and electrical relation between the conveying apparatus and the releases.

Figure 1:
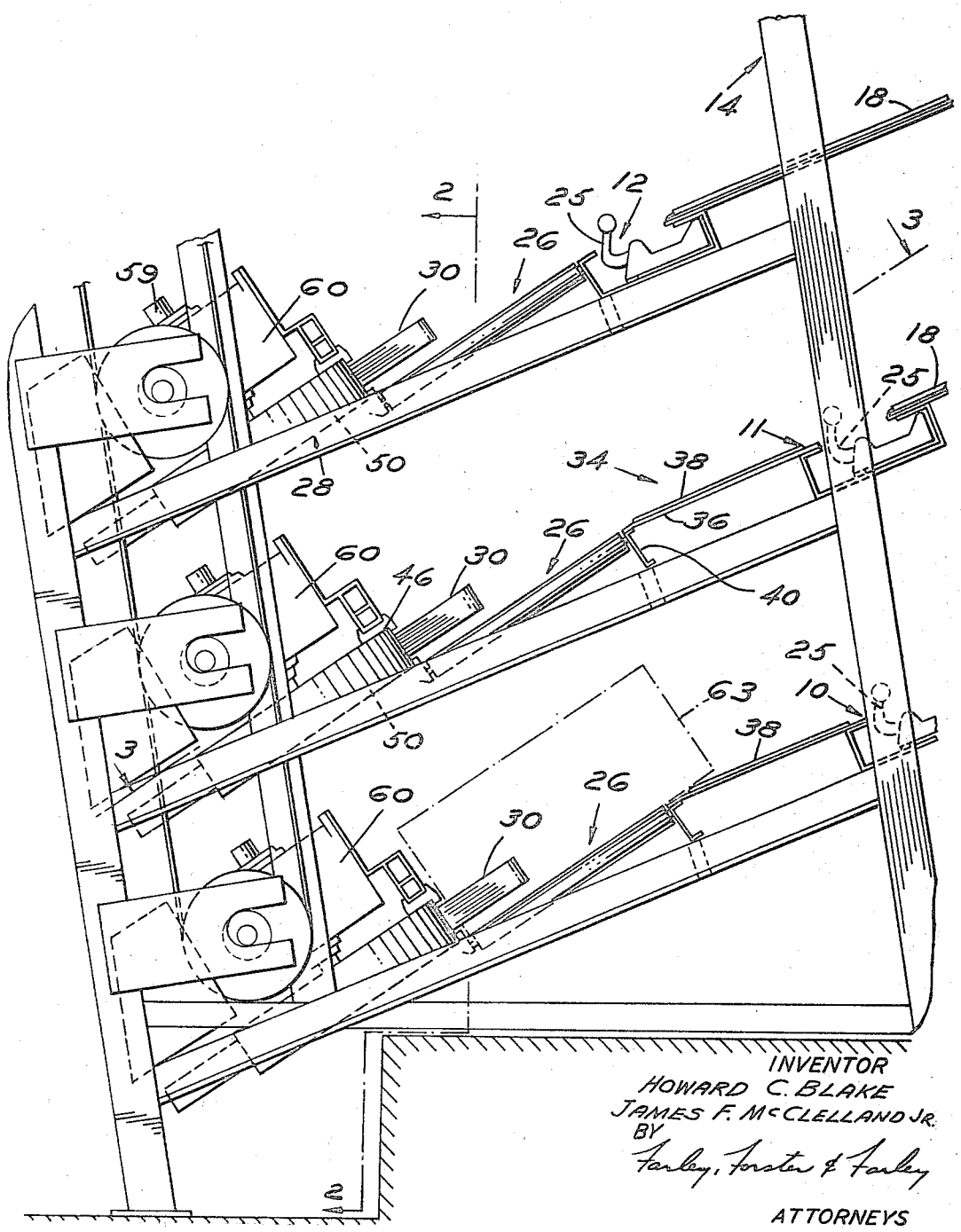
FIGURE 1 is a side elevation of the discharge ends of three superimposed rows of article supporting chutes, each row delivering articles released to receiving and conveying apparatus constructed in accordance with the invention.

Referring to FIGS. 1, 3 and 4, the article supporting structure illustrated is installed at a plurality of three superimposed levels 10, 11 and 12 on suitable framework 14. At each level, as best shown in FIG. 3, a number of chutes are installed in side-by-side relation, each chute including a pair of side walls 16 and 17 and a pair of article supporting runners 18 and 19. A release device 22 is mounted adjacent the discharge end 23 of each chute within a U-shaped housing 24 extending along the ends of the chutes. These release devices may be of the type shown in U.S. Patent 3,008,560 and hence will not be described in further detail except to explain that each includes a solenoid which when actuated moves an article retaining member 25 from the normal position shown in FIG. 4 to a retracted position within the housing 24 and below the level of the chute runners. An article is thus permitted to move off the discharge end of the chute and the release member 25 returns to normal position to arrest movement of an immediately following article until a new actuating signal is received.

At each of the article supporting levels 10, 11 and 12, the apparatus for receiving and conveying articles released from the chutes includes a roller conveyor 26, and a belt conveyor 28 equipped with a series of equally spaced resilient pushers 30 which on the forwarding reach of the endless belt conveyor, indicated by the arrow 31 in FIG. 3, project over a portion of the bed of the roller conveyor 26. Additionally, at the levels 10 and 11, the apparatus includes apron means 34 mounted between the discharge end 23 of the chutes and the side of the roller conveyor 26 adjacent thereto, the apron means consisting of a sheet metal panel 36 equipped with low friction article supporting runners 38.

Considering these components in the order engaged by a released article on the levels 10 and 11, the sheet metal panel 36 of the apron means extends between and is supported by the release housing 24 and the roller conveyor side rail 40 at an angle of inclination preferably slightly greater than that of the article supporting chutes, with the upper surfaces of the runners 38 slightly below the level of the runners 19 of the chute. The rollers 42 of the roller conveyor, which are mounted between the side rail 40 and a depending flange 43 of a guide and supporting member 44 for the belt conveyor, have their axes, as shown in FIG. 3, extending at an acute angle to the forwarding reach of the endless belt conveyor with reference to the forwarding direction of travel 31 thereof; also, as shown in FIG. 4 the plane of the axes of the rollers 42 is inclined at an angle greater than the angle of inclination of the plane of the article supporting chutes and greater than the angle of inclination of the apron means 34.

The endless conveyor 28 consists in a metal belt 46 equipped with driving lugs 47 which engage teeth 48 of a drive sprocket 50 and of a similar take-up or idler sprocket (not shown) mounted at the other end of the bank of chutes. Each of the pushers 30 secured to the outer face of the belt is preferably of multi-leaf resilient construction as shown. Between the drive sprocket 50 and the idler sprocket, the belt 46 is mounted and supported on both the forward and return reaches thereof by the member 44 which is suspended from a tubular frame member 54. The member 44 is of extruded section, as best shown in FIG. 4, and includes belt guiding flanges 56 and 58 for the forwarding and return reaches of the belt respectively. As shown in FIGS. 1 and 2, each drive sprocket 50 is driven by the output shaft 59 of a gear box 60, the input shafts 61 of all gear boxes being coupled by belt drive connections to a single motor 62 for synchronized operation of the conveyors 28 at all levels.

At the upper level 12, the roller conveyor 26 is mounted adjacent the release devices 12 at the discharge end of the article supporting chutes with no intermediate apron, and with the axes of the rollers in a plane inclined at an angle not less and preferably greater than the inclination of the chutes. This form of construction is used where there is little difference in size, weight and general characteristics between the articles handled on a row of side-by-side chutes.

On the other hand, the use on the levels 10 and 11 of an apron, installed at an angle of inclination less than the roller conveyor, reduces the cost of the installation for the handling of articles having a wider variation in size. Articles having a length along a chute greater than the width of the roller conveyor will overlap but not contact the apron when engaged by the belt conveyor, as illustrated by the article 63 in FIG. 1.

When an article, such as the carton 64 indicated in FIG. 4, is released, it tends to accelerate in passing over the more steeply inclined low friction runners 38 of the apron, and slides across the upper surface of some of the rollers 42 of the roller conveyor. Since these rollers are mounted with their axes in a plane having a greater inclination than the apron means, the article is further accelerated, not only due to the greater inclination of the rollers but also due to the loss in frictional engagement which takes place as the article changes direction in passing from the apron to the rollers.

As an example of the relative inclination between the chutes, the apron means and the roller conveyor, the chutes may be mounted at an angle of 17° to the horizontal, the apron at a slightly increased angle of 19°, and the roller conveyor mounted so that the axes of the plane of the rollers thereof is inclined at an angle of 33°.

Operation of the release devices 22 is preferably synchronized with the movement of the conveyors 28 by means such as schematically illustrated in FIG. 5. A cam 65 is driven by a suitable mechanical connection 66 from the output shaft 59 of a gear box 60 so that the cam turns one revolution as the conveyor 28 moves the distance between an adjacent pair of pushers 30. A switch 68 is arranged to control the selection circuit for energizing a release device 22 or group of release devices so that a release energizing signal will only flow when the switch 68 is actuated by the cam 65 with which it is associated. By properly positioning the cam 65, any timing required can be set for the operation of a release device relative to the position of a pusher 30 approaching the discharge end of a chute at which the release device is mounted so that an article released will be engaged by the approaching pusher. Different articles may move at sufficiently different rates when released to require a different timing and this can be provided by employing an additional cam 69 and switch 70 to control the operation of another release device or group thereof. When the apparatus is in operation, the endless conveyor 28 is continuously driven, and a released article slides across the roller conveyor ahead of one of the pushers 30 of the endless conveyor. The resulting impact between the article and one of the pushers 30 is partly absorbed by the resilient construction of the pushers, and the article is given a nudge in the forwarding direction of movement 31 of the endless conveyor. As soon as forward article movement begins, the article is urged downwardly into positive engagement with the pusher by the action of the skewed rollers of the roller conveyor. This effectively overcomes the tendency of an article to pivot around one of the pushers and allow the pusher to pass by, regardless of article size or weight.

The combination of the inclined roller conveyor and endless belt conveyor also reduces the spacing between the chute levels 10, 11 and 12 required for handling articles of a given size range so that the overall installation is more compact in vertical dimension.

We claim:

1. Apparatus for conveying articles comprising the combination of a roller conveyor, an endless conveyor having longitudinally spaced resilient pushers thereon adapted to engage articles supported on the roller conveyor, means mounting the endless conveyor for travel on forwarding and return reaches with the forwarding reach adjacent and parallel to one side of the roller conveyor, the rollers of the roller conveyor being mounted with their axes extending at an acute angle to the forwarding reach of the endless conveyor with reference to the forwarding direction of travel thereof whereby an article supported on the roller conveyor will be retained in engagement with a pusher of the endless conveyor in response to the forwarding article movement resulting from initial engagement of a pusher with the article.

2. Apparatus as claimed in claim 1 wherein the endless conveyor consists of a belt which on the forwarding reach travels in a plane perpendicular to the axes of the rollers of the roller conveyor.

3. Apparatus as claimed in claim 1 wherein the rollers of the roller conveyor are mounted with the plane of the axes thereof inclined downwardly toward the said one side of the roller conveyor thereby creating a gravity force urging an article into engagement with a pusher of the endless conveyor.

4. In article supporting and conveying apparatus including supporting structure providing a plurality of rows on an inclined plane for the storage and gravity-urged movement of articles on each row to the lower discharge end thereof, an article release device for each row, and means mounting the release devices at the discharge ends of the rows; the improvement comprising:

a roller conveyor;
   means mounting the roller conveyor with one side thereof extending along the discharge ends of the article storage rows and with the rollers thereof positioned with their axes in an inclined plane extending at an angle of inclination not less than that of the inclined plane of the article storage rows for sliding movement across the roller conveyor of articles discharged from the storage rows by the release devices;
   an endless conveyor;
   means mounting the endless conveyor for travel on forwarding and return reaches with the forwarding reach adjacent and parallel to the other side of the roller conveyor; and
   pusher members mounted on the endless conveyor, each pusher member overlapping on the forwarding reach of the endless conveyor at least a portion of the roller conveyor for engagement with an article supported thereon.

5. Appartus according to claim 4 wherein each of the pusher members mounted on the endless conveyor is resilient.

6. Apparatus according to claim 4 wherein the rollers of the roller conveyor are mounted with their axes extending at an acute angle to the forwarding reach of the endless conveyor with reference to the forwarding direction of travel thereof whereby an article supported on the roller conveyor will be retained in engagement with a pusher thereof in repsonse to the forwarding article movement resulting from initial engagement of a pusher with the article.

7. Apparatus according to claim 6 wherein the portion of the roller conveyor overlapped by a pusher member is less than one-half the dimension transversely of the roller conveyor of an article supported thereon.

8. Apparatus according to claim 7 wherein the pushers are resilient.

9. Apparatus according to claim 4 wherein the endless conveyor consists of a belt which on the forwarding reach travels in a plane perpendicular to the axes of the rollers of the roller conveyor.

10. Apparatus according to claim 4 wherein the plane of the axes of the rollers of the roller conveyor is inclined at an angle greater than that of the inclined pane of the article storage rows.

11. Apparatus according to claim 10 further comprising apron means disposed between the discharge ends of the article storage rows and the side of the roller conveyor adjacent thereto, and means mounting the apron means at an angle of inclination less than that of the plane of the axes of the rollers of the roller conveyor and not less than the plane of the article storage rows for slidably conveying an article to the roller conveyor.

12. Apparatus according to claim 4 further comprising apron means disposed between the discharge ends of the article storage rows and the side of the roller conveyor adjacent thereto, means mounting the apron means at an angle of inclination greater than that of the plane of the article storage rows, and wherein the means mounting the roller conveyor positions the rollers thereof with their axes in an inclined plane extending at an angle of inclination greater than that of the plane of the apron means.

13. Apparatus according to claim 4 wherein the endless conveyor is provided with a plurality of equally spaced driving lugs secured thereto and projecting oppositely from said pusher members, and means for driving the endless belt including a sprocket having spaced recesses on the driving face thereof for engagement by said lugs of the endless belt.

14. In article supporting and conveying apparatus including supporting structure providing a plurality of rows on an inclined plane for the storage and gravity-urged movement of articles on each row to the lower discharge end thereof, an article release device for each row, and means mounting the release devices at the discharge ends of the rows; the improvement comprising, means for supporting and conveying articles in a direction normal to that of the gravity-urged movement thereof mounted adjacent the discharge ends of the article storage rows, the article supporting and conveying means having an article supporting surface which in the direction of gravity-urged article movement extends at an angle of inclination not less than that of the inclined plane of the article storage rows for sliding movement on said supporting surface of articles discharged from the storage rows by the release devices, and the article supporting and conveying means including an endless member having longitudinally spaced article engaging pushers thereon.

15. Apparatus according to claim 14, wherein the article supporting and conveying means includes a roller conveyor forming the article supporting surface, the pushers of the endless conveyor being adapted to engage articles supported on the roller conveyor.

16. In article storage and conveying apparatus including supporting structure providing a plurality of superimposed article supporting levels, each level having a plurality of inclined article supporting rows, the improvement comprising means for supporting and conveying articles mounted adjacent and transverse the discharge end of the article supporting rows at each level, each article supporting and conveying means including an endless member having a plurality of spaced pushers, means for synchronously driving the endless members, a plurality of article release devices, means mounting one of said release devices at the discharge end of each row of articles, and means for operating a release device in synchronized relation to the position of a pusher relative to the discharge end of a row of articles which the pusher is approaching.

17. Apparatus as claimed in claim 16 wherein the means for synchronously driving the endless members comprises a drive sprocket for each endless member with interengaging driving elements on the drive sprocket and the endless member for imparting positive driving motion thereto, a drive motor, and means coupling each of the drive sprockets to the drive motor.

18. In article supporting and conveying apparatus including supporting structure providing a plurality of inclined rows for the storage and gravity-urged movement of articles to the lower discharge end thereof, an article release device for each row, and means mounting the article release devices at the discharge ends of the rows, the improvement comprising;

means for supporting and conveying articles including an endless member having a plurality of spaced pushers,
   means mounting the endless member adjacent and transverse the discharge end of the inclined rows,
   means for driving the endless member,
   and means for operating a release device in synchronized relation to the position of a pusher relative to the discharge end of row which the pusher is approaching.

19. Apparatus according to claim 18 wherein the means for operating a release device includes a release device selection circuit.

20. Apparatus according to claim 18 wherein the means for operating a release device is mechanically connected with the endess member driving means to function at a rate proportional to the speed of the endless member and to the number of pushers thereon.

21. Apparatus as claimed in claim 18 wherein the means for driving the endless member comprises a drive motor, a drive sprocket coupled therewith, and interengaging driving elements on the drive sprocket and the endless member.

References Cited

UNITED STATES PATENTS

| | | | |
|---|---|---|---|
| 3,176,828 | 4/1965 | Sullivan | 198—127 |
| 3,239,054 | 3/1966 | Eliassen | 198—21 |
| 981,303 | 1/1911 | Paul | 198—35 |
| 1,954,278 | 4/1934 | Adams | 198—23 |
| 2,284,490 | 5/1942 | Lueckel | 198—35 |
| 2,738,103 | 3/1956 | Bisese | 193—40 |
| 3,064,783 | 11/1962 | McClelland | 198—38 |

FOREIGN PATENTS 1,188,349   9/1959   France.

RICHARD E. AEGERTER, *Primary Examiner.*

U.S. Cl. X.R.

198—171; 193—35, 40